United States Patent
Fukushima et al.

(10) Patent No.: US 7,161,707 B1
(45) Date of Patent: Jan. 9, 2007

(54) DIGITAL PRINTER

(75) Inventors: Tsumoru Fukushima, Kyoto (JP); Haruo Yamashita, Osaka (JP); Takeshi Ito, Osaka (JP); Yoshiyasu Kado, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/979,379

(22) PCT Filed: May 19, 2000

(86) PCT No.: PCT/JP00/03227

§ 371 (c)(1),
(2), (4) Date: Feb. 14, 2002

(87) PCT Pub. No.: WO00/72579

PCT Pub. Date: Nov. 30, 2000

(30) Foreign Application Priority Data

May 21, 1999 (JP) .................................. 11-141488

(51) Int. Cl.
*G06F 15/00* (2006.01)
(52) U.S. Cl. .................. 358/1.6; 358/1.15; 712/28; 355/46
(58) Field of Classification Search .................. 358/1.6, 358/1.15; 712/28; 355/46
See application file for complete search history.

(56) References Cited

U.S. PATENT DOCUMENTS

| 5,101,496 | A | | 3/1992 | Hayashi ..................... 358/1.13 |
|---|---|---|---|---|
| 5,287,194 | A | * | 2/1994 | Lobiondo .................... 358/296 |
| 5,574,831 | A | * | 11/1996 | Grenda ........................ 358/1.4 |
| 5,606,365 | A | | 2/1997 | Maurinus et al. ......... 348/222.1 |
| 5,625,757 | A | * | 4/1997 | Kageyama et al. ......... 358/1.14 |
| 5,690,439 | A | | 11/1997 | Sasaki et al. |
| 5,720,562 | A | | 2/1998 | Ogawa |
| 5,813,348 | A | * | 9/1998 | Zingher ...................... 101/494 |
| 5,836,703 | A | | 11/1998 | Watanabe |
| 5,859,711 | A | * | 1/1999 | Barry et al. ................. 358/296 |
| 5,863,138 | A | | 1/1999 | Watanabe et al. |
| 5,897,260 | A | * | 4/1999 | Zingher ...................... 400/719 |
| 5,996,029 | A | * | 11/1999 | Sugiyama et al. ............ 710/15 |
| 6,000,868 | A | | 12/1999 | Watanabe et al. |
| 6,025,924 | A | * | 2/2000 | Miura et al. ............... 358/1.15 |
| 6,157,459 | A | * | 12/2000 | Shiota et al. .............. 358/1.15 |

(Continued)

FOREIGN PATENT DOCUMENTS

EP 860980 8/1998

(Continued)

OTHER PUBLICATIONS

International Search Report dated Jul. 28, 2000, application No. PCT/JP00/03227.

*Primary Examiner*—Twyler Lamb
*Assistant Examiner*—Mark R. Milia
(74) *Attorney, Agent, or Firm*—RatnerPrestia

(57) ABSTRACT

Comprising a data reader 31 for reading digital camera image data, a means 32 for setting, for example, the number of prints, a plurality of printers 33, a printer selector 34 for selecting which of the plurality of printers to use, and a controller 35 for sending a specific control signal to the printer selector 34 and image data to a specific printer 33 based on the information set by the setting means 32, each printer 33 is provided with an image processing circuit 36 for processing the read image data.

9 Claims, 23 Drawing Sheets

| U.S. PATENT DOCUMENTS | | | | FOREIGN PATENT DOCUMENTS | | |
|---|---|---|---|---|---|---|
| 6,169,596 B1 * | 1/2001 | Shiota ......................... 355/40 | | JP | 1-180622 | 7/1989 |
| 6,301,586 B1 * | 10/2001 | Yang et al. ............... 707/104.1 | | JP | 2-196679 | 8/1990 |
| 6,339,478 B1 * | 1/2002 | Kawasaki .................. 358/1.17 | | JP | 3-217937 | 9/1991 |
| 6,504,960 B1 * | 1/2003 | Takahashi ................... 382/305 | | JP | 4-184618 | 7/1992 |
| 6,529,286 B1 * | 3/2003 | King ........................ 358/1.14 | | JP | 6-44017 | 2/1994 |
| 6,549,654 B1 * | 4/2003 | Kumada ...................... 382/162 | | JP | 8-34147 | 2/1996 |
| 6,573,927 B1 * | 6/2003 | Parulski et al. ............... 348/32 | | JP | 08063305 | 3/1996 |
| 6,606,165 B1 * | 8/2003 | Barry et al. .................. 358/1.9 | | JP | 8-90890 | 4/1996 |
| 6,618,553 B1 * | 9/2003 | Shiohara .................... 386/117 | | JP | 8-164645 | 6/1996 |
| 6,654,136 B1 * | 11/2003 | Shimada .................... 358/1.15 | | JP | 8-249139 | 9/1996 |
| 6,657,702 B1 * | 12/2003 | Chui et al. .................... 355/40 | | JP | 9-265141 | 10/1997 |
| 6,784,925 B1 * | 8/2004 | Tomat et al. .......... 348/207.11 | | JP | 10-78620 | 3/1998 |
| 6,804,017 B1 * | 10/2004 | Itoh ........................ 358/1.14 | | JP | 11-95953 | 4/1999 |
| 6,856,413 B1 * | 2/2005 | Roosen et al. ............. 358/1.15 | | | | |
| 6,888,641 B1 * | 5/2005 | Koana ...................... 358/1.15 | | * cited by examiner | | |

Fig.8

| PRINTER | PRINT 20 PICTURES FROM No.3 PRINTER | | PRINT 10 PICTURES FROM No.2 PRINTER | |
|---|---|---|---|---|
| No. 1 |  | 1 2 3 | 1 2 | 1 2 |
| No. 2 |  | 4 5 | →4 3 | 3 4 |
| No. 3 |  | 6 7 8 | 6 7 8 | 5 6 5 6 |
| No. 4 |  | 9 10 11 | 9 10 11 | 7 | → 7 |
| No. 5 |  | 12 13 14 | 12 13 14 | 8 | 8 |
| No. 6 |  | 15 16 17 | 15 16 17 | 9 | 9 |
| No. 7 |  | 18 19 20 | 18 19 20 | 10 | 10 |

Fig.9

| PRINTER | PRINT 20 PICTURES FROM No.3 PRINTER (ERROR OCCURS WHILE PRINTING THE SECOND PRINT ON THE No.5 PRINTER) | | PRINT 10 PICTURES FROM No.2 PRINTER | |
|---|---|---|---|---|
| No. 1 | 1<br>2<br>3 | 1<br>2<br>3 | 1<br>2 | 1<br>2 |
| No. 2 | 4<br>5 | 4<br>5 | 3<br>→ 4 | 3<br>4 → |
| No. 3 | 6<br>7<br>8 | 6<br>7<br>8 | 5<br>6 | 5<br>6 |
| No. 4 | 9<br>10<br>11 | 9<br>10<br>11 | 7<br>8 | 7<br>8 |
| No. 5 | *<br>*<br>14 | 14 | REMOVED BY ERROR | |
| No. 6 | RESCHEDULING 12<br>RESCHEDULING 13<br>15<br>16<br>17 | 12<br>13<br>15<br>16<br>17 | SUSPENDED | |
| No. 7 | 18<br>19<br>20 | 18<br>19<br>20 | 9<br>10 | 9<br>10 |

Fig.10

| PRINTER | PRINT 20 PICTURES FROM No.3 PRINTER (ERROR OCCURS WHILE PRINTING THE SECOND PRINT ON THE No.5 PRINTER) | | PRINT 10 PICTURES FROM No.2 PRINTER | |
|---|---|---|---|---|
| No. 1 | 1<br>2<br>3 | 1<br>2<br>3 | 1<br>2 | 1<br>2 |
| No. 2 | RESCHEDULING 12<br>4<br>5 | 12<br>4<br>5 | 3 →| 3 |
| No. 3 | RESCHEDULING 13<br>6<br>7<br>8 | 13<br>6<br>7<br>8 | 4 | 4 |
| No. 4 | 9<br>10<br>11 | 9<br>10<br>11 | 5<br>6 | 5<br>6 |
| No. 5 | *<br>*<br>14 | 14 | REMOVED BY ERROR | |
| No. 6 | 15<br>16<br>17 | 15<br>16<br>17 | 7<br>8 | 7<br>8 |
| No. 7 | 18<br>19<br>20 | 18<br>19<br>20 | 9<br>10 | 9<br>10 |

Fig. 17

S15 DESIGNATING FOR IMAGE PRINTED. 1/5 CANCEL

| No.1 | No.2 | |
| --- | --- | --- |
| | No.3 | |
| | | |

PLEAE SELECT THE IMAGE YOU WANT PRINTING.

| ALL RESERVED /ALL CLEAR | NEXT PAGE | PREVIOUS PAGE | COMPLETED |

☐ TOUCH→ ☐ TOUCH→ ☐
NOT RESERVED   RESERVED   NOT RESERVED

S16 DESIGNATING FOR IMAGE PRINTED. 1/5 CANCEL

| No.2 3PRINTS | No.5 4PRINTS | No.9 1PRINTS | No.12 2PRINTS |
| --- | --- | --- | --- |
| | | | |
| | | | |

PLEASE THE IMAGE AND PUT IN THE NUMBER.

| 1 | 2 | 3 | 4 | 5 | 6 | 7 | 8 | 9 | 0 | PRINTS |

| NEXT PAGE | COMPLETED |

No.2 TOUCH→ 3 PRINTS → No.2
1PRINT         ON        3PRINT

S17 SELECTING THE PRINT SIZE. CANCEL

[ No.2 ]   [ No.2 ]

PLEASE SELECT THE REQUESTED SIZE.

PRINTING IS DONE BY REQUESTED SIZE.

S18 CONFIRMATION. CANCEL

TOTAL NUMBER OF PRINTING IS 25

A FEE FOR PRINTING IS **** YEN.

ALL RIGHT? → PRINT START

Fig. 18

S21
>>Digital μ Lab<<

IMAGE PRINTING SERVICE
WRITE SERVICE

① CARD (PC/CF/SM)
② CAMERA (IRDA)
③ STORAGE DEVICE

SET ANY OF THEM TO THE FIXED SLOT

S22
SELECTING THE FOLDER. 1/5 CANCEL 98.1.12 IZU
98.1.13 NEWYORK

NEXT PAGE
COMPLETED

PLEASE SELECT THE FULDER CONTAINING THE IMAGE PRINTED.

S23
DESIGNATING FOR IMAGE PRINTED. 1/5 CANCEL

No.1  No.2  No.3

NEXT PAGE | PREVIOUS PAGE | COMPLETED

PLEAE SELECT THE IMAGE YOU WANT PRINTING.

ALL RESERVED /ALL CLEAR

☐ →TOUCH→ ☐ →TOUCH→ ☐
NOT RESERVED  RESERVED  NOT RESERVED

S24
DESIGNATING FOR IMAGE PRINTED. 1/5 CANCEL

No.2  No.5  No.9  No.12
3PRINTS 4PRINTS 1PRINTS 2PRINTS

NEXT PAGE
COMPLETED

PLEASE THE IMAGE AND PUT IN THE NUMBER.

| 1 | 2 | 3 | 4 | 5 | 6 | 7 | 8 | 9 | 0 | PRINTS |

☐ →TOUCH→ No.2 3 PRINTS → No.2 3PRINT
No.2  1PRINT  ON
1PRINT

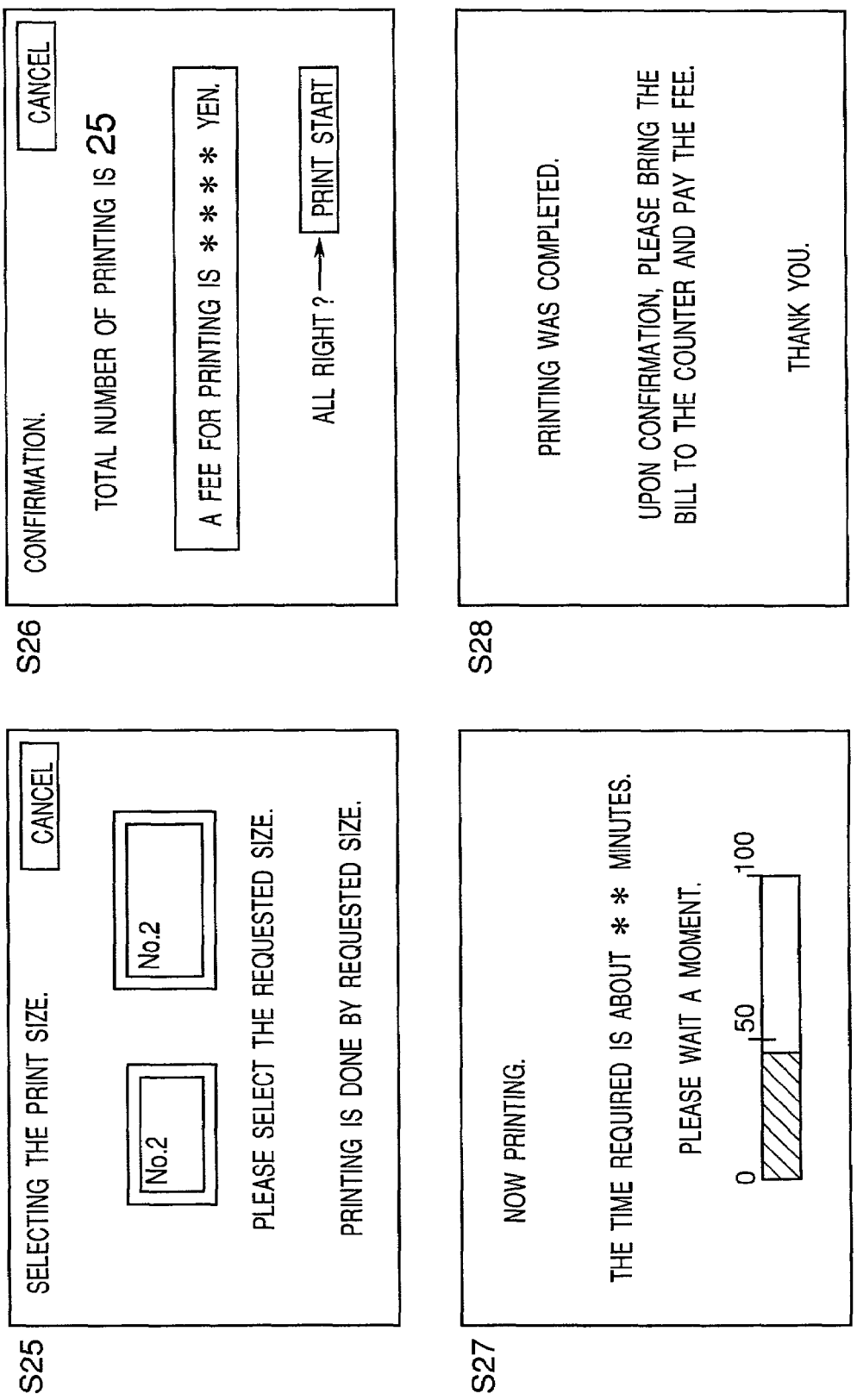

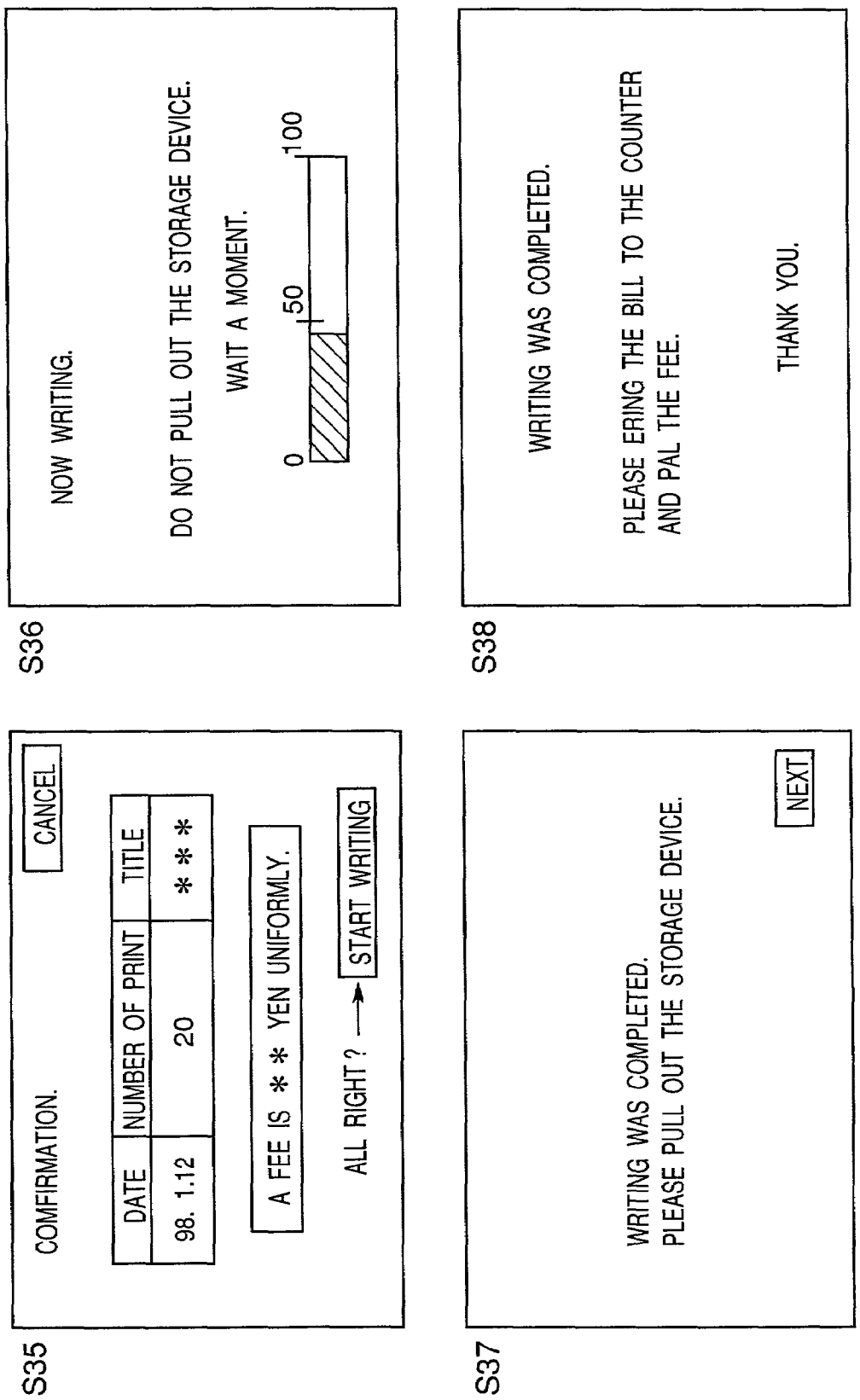

Fig.23

| PRINTER | NUMBER OF PRINTS | | | | | | | | |
|---|---|---|---|---|---|---|---|---|---|
| | 1th | 2th | 3th | | 20th | 21th | 22th | 23th | 24th |
| | 3 | 2 | 5 | ... | 1 | 2 | 3 | 4 | 3 |
| No. 1 | ON / 19 | ON / 18 | ON / 17 | ... | ON / 1 | ON / 0 | ✕ | 20 | 20 |
| No. 2 | ON / 19 | ON / 18 | ON / 17 | ... | ON / 2 | ON / 1 | ON / 0 | ✕ | 20 |
| No. 3 | ON / 19 | 19 | ON / 18 | ... | ON / 9 | 9 | ON / 8 | ON / 7 | ON / 6 |
| No. 4 | 20 | 20 | ON / 19 | ... | ON / 14 | 14 | ON / 13 | ON / 12 | ON / 11 |
| No. 5 | 20 | 20 | ON / 19 | ... | 19 | 19 | 19 | ON / 18 | ON / 17 |
| No. 6 | 20 | 20 | 20 | ... | 20 | 20 | 20 | ON / 19 | 19 |
| No. 7 | 20 | 20 | 20 | ... | 20 | 20 | 20 | 20 | 20 |
| No. 8 | 20 | 20 | 20 | ... | 20 | 20 | 20 | 20 | 20 |
| No. 9 | 20 | 20 | 20 | ... | 20 | 20 | 20 | 20 | 20 |
| No. 10 | 20 | 20 | 20 | ... | 20 | 20 | 20 | 20 | 20 |
| No. 11 | 20 | 20 | 20 | ... | 20 | 20 | 20 | 20 | 20 |
| No. 12 | 20 | 20 | 20 | ... | 20 | 20 | 20 | 20 | 20 |
| STARTING PRINTER | 1 | 1 | 1 | 1 | 1 | 1 | 2 | 3 | 3 |

DIGITAL PRINTER

This application is a U.S. National Phase application of PCT International application PCT/JP00/03227.

TECHNICAL FIELD

The present invention relates to a digital printer for automatically printing out image data read from a storage medium

BACKGROUND ART

Digital cameras that store image data captured with a CCD imaging element in memory are quickly become widely available. Image data stored in memory can be transferred to a personal computer and output using a color printer. However, printing is difficult for people that do not have a personal computer or are not particularly adept at such tasks. This has led to DPE services (referred to below as electronic DPE) that print electronic data output from a digital still camera, for example, being provided.

When the memory is removed from the camera and taken to a camera store that handles electronic DPE, the image data is read from memory on a terminal, sent on-line to a center, and printed to normal imaging paper in that center. The finished prints are then sent to the camera store. With this system, however, several days are required to obtain the finished prints, and this is contradictory to the speed, that is, the ability to see the pictures soon after taking them, that is one characteristic of digital cameras.

High resolution color printers that can be used for on-demand printing when [the memory] is taken to the camera shop have been developed. However, printing a number of pictures is time consuming even when plural printers are available, and because operation is not simple, customers cannot print their own pictures, resulting in high printing fees due to labor costs.

The present invention was developed to resolve the above noted problems, and an object of the present invention is to provide a digital printer that is suitable for installation in convenience stores and can perform a printing process automatically and in a short time when a storage medium is simply inserted thereto.

JP 08 063305 A discloses a print system which can designate the optional one with its priority out of those print devices that are provided in the remote places. By use of printed designation information the available one of print devices that has the highest priority and is suited for designation is selected for printing.

DISCLOSURE OF INVENTION

A digital printer according to the present invention is, as shown in FIG. 1, a digital printer for printing out image data read from a storage medium using a printer, having a data reading means (31) for reading image data from a storage medium, a setting means (32) for setting printing parameters a plurality of printers (33), a printer selection means (34) for selecting which of the plurality of printers to use, and a controller (35) for sending a specific control signal to the printer selection means (34) and read image data to a selected printer (33) based on information set by the setting means (32), and is characterized by providing each printer (33) with an image processing circuit (36) for processing the unprocessed read image data after being received As shown in claim 2, it is also possible to provide a printer usage determining means (39) for determining which printer to use so that each printer is averagely used, or to provide as shown in FIG. 4 a printer usage priority determining means (39a) for determining what printer is used so a printer predetermined from amongst the printers is used with priority.

BRIEF DESCRIPTION OF DRAWINGS

FIG. 8 shows the operation of each printer when printing a plurality of photographs.

FIG. 9 shows the operation of each printer when printing a plurality of photographs.

FIG. 10 shows the operation of each printer when printing a plurality of photographs.

FIG. 17 is a continuation of the operating sequence shown in FIG. 16.

FIG. 18 shows the operating sequence presented on a display when selecting the image printing service, and printing images from a memory device, in FIG. 13.

FIG. 19 is a continuation of the operating sequence shown in FIG. 18.

FIG. 21 is a continuation of the operating sequence shown in FIG. 20.

FIG. 23 shows the operation of each printer when printing a plurality of photographs based on the flow chart shown in FIG. 22.

BEST MODE FOR CARRYING OUT THE INVENTION

Figure 1:
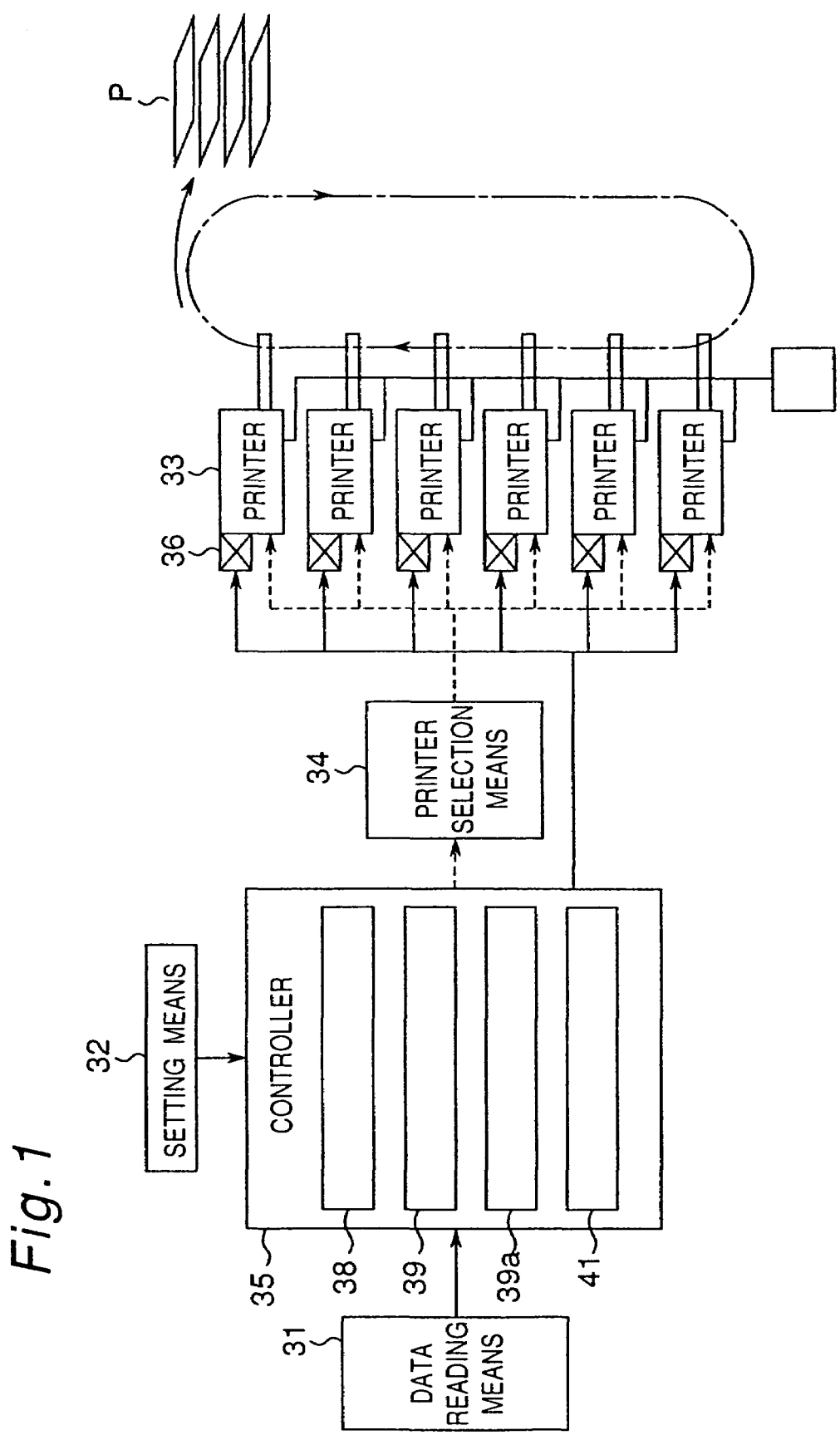
FIG. 1 corresponds to the claims of the present invention.
Figure 2:
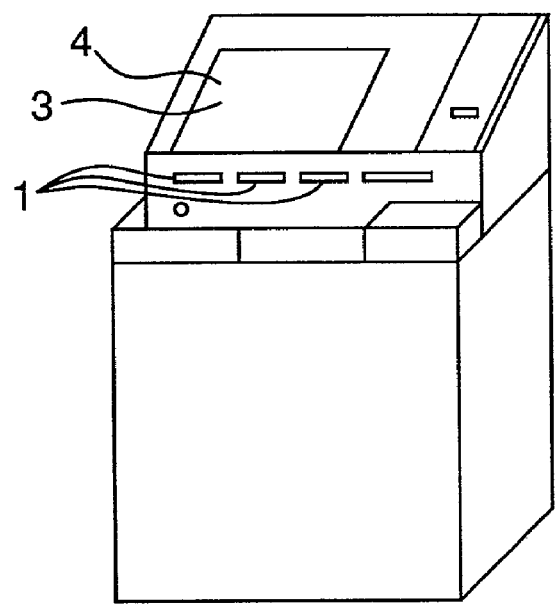
FIG. 2 is an external view of a digital printer according to the present invention.
Figure 3:
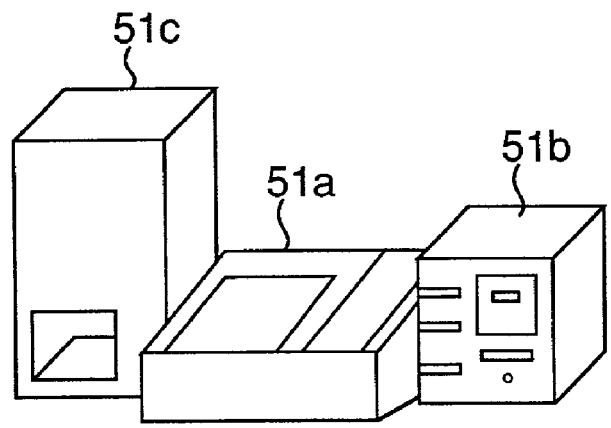
FIG. 3 is an external view of a separate embodiment of a digital printer according to the present invention.

FIG. 2 shows the outside of a digital printer 50 according to the present invention. Reference numeral 1 is an insertion opening to an image data reader for reading image data from various storage media, and reference numeral 3 is a liquid crystal display; a touch panel 4 is applied to the display surface of this LCD 3. A user can input various settings, such as the number of prints to make, by way of this touch panel 4. FIG. 3 shows a digital printer 50 according to another embodiment of the present invention, in this case a desktop type in which the display 51a, operating unit 51b, and print unit 51c are separated.

Figure 4:
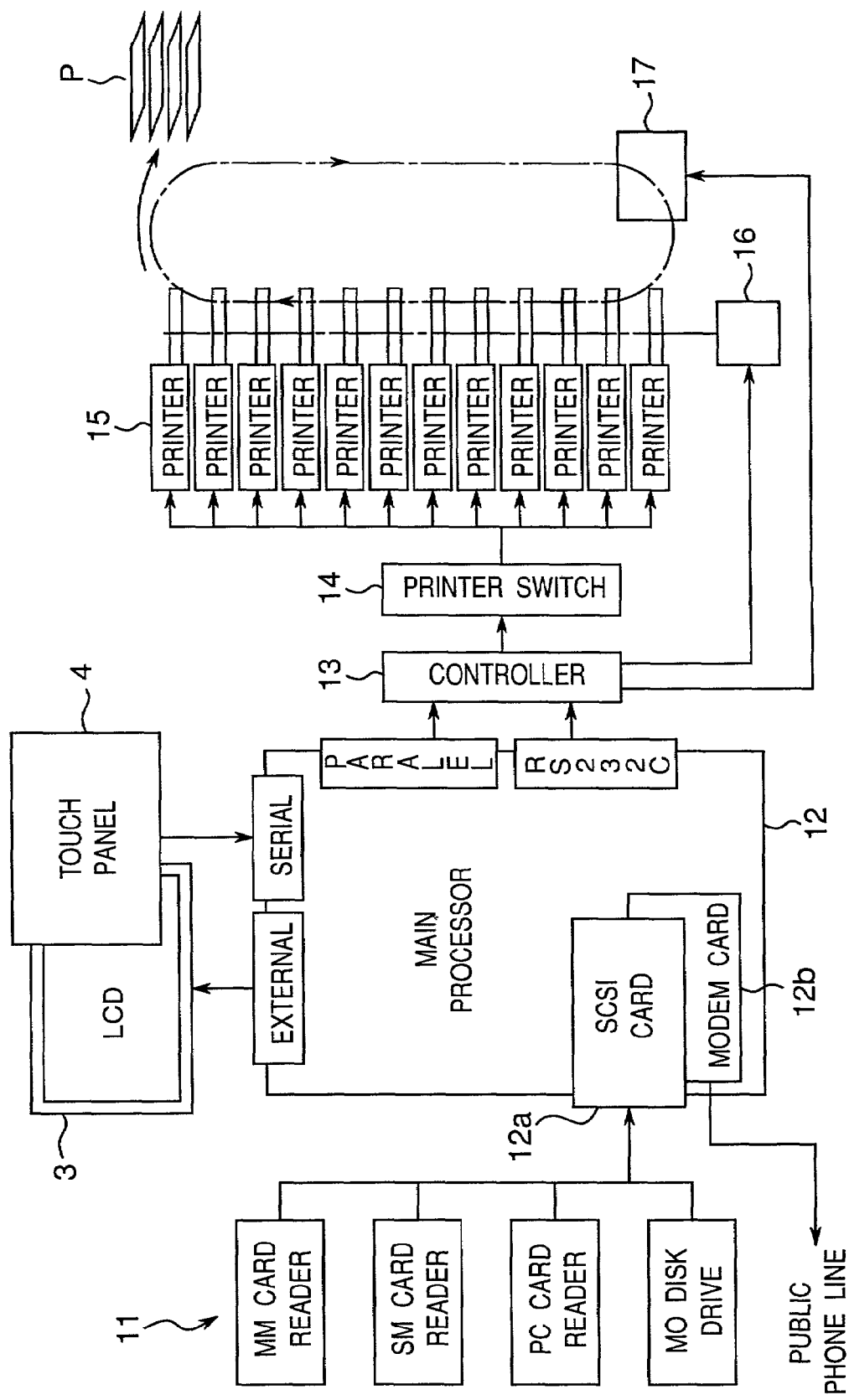
FIG. 4 is a control block diagram showing a first embodiment of a digital printer according to the present invention.

FIG. 4 is a control block diagram of a first embodiment of this type of digital printer 50. Reference numeral 11 is an image data reader for reading image data from various storage media, and comprises readers for multimedia (MM) cards, Smart Media (SM) cards, Compact Flash (CF) memory cards, and a drive for MO discs.

Reference numeral 12 is the main processor part of a notebook computer; a control program for accomplishing the above-noted ink usage manager 38, print unit selector 39, and destination/sequence adjusting means 41 in software is stored in the internal ROM, and an interface is provided for displaying a menu of the operating procedure when printing with this system so that a desired menu selection can be entered using the touch panel 4. The above-noted image data reader 11 is connected by way of a SCSI card 12a installed to a PC card slot provided in the main processor 12 of the notebook computer. Furthermore, a modem card 12b can be installed to this PC card slot as necessary so that the system can be connected on-line to a maintenance company via a public phone line. The LCD 3 is connected to the external monitor terminal of the main processor 12, and the touch panel 4 is connected to a serial port.

Reference numeral 13 is a controller connected to the main processor 12 by way of a Centronics parallel port and an RS-232C port; reference numeral 14 is a printer switch 14 for selecting which of the twelve dye sublimation color printers 15 to operate based on a command from the controller 13. Each of the color printers 15 has an internal image processing circuit for developing the compressed image data supplied from printer controller 13. Reference numeral 16 is an ink changer 16 for exchanging an ink [unit] that has become empty in a color printer 15 with a spare ink [unit]. The number of prints that can be made is fixed in a dye sublimation printer regardless of the combination of colors printed, and the ink must be replaced once this specific number of prints is made.

With this digital printer, which printer 15 is used is determined under the control of the main processor 12 so that each printer 15 is averagely used; when ink is consumed in all of the printers 15, it is batch replaced with spare ink by the ink changer 16. If the spare ink supply is then also replenished at this time, ink depletion can be avoided. When the ink supply is replaced with the spare ink, it is also possible to notify the maintenance company by way of the modem card 12b that maintenance is required.

Figure 5:
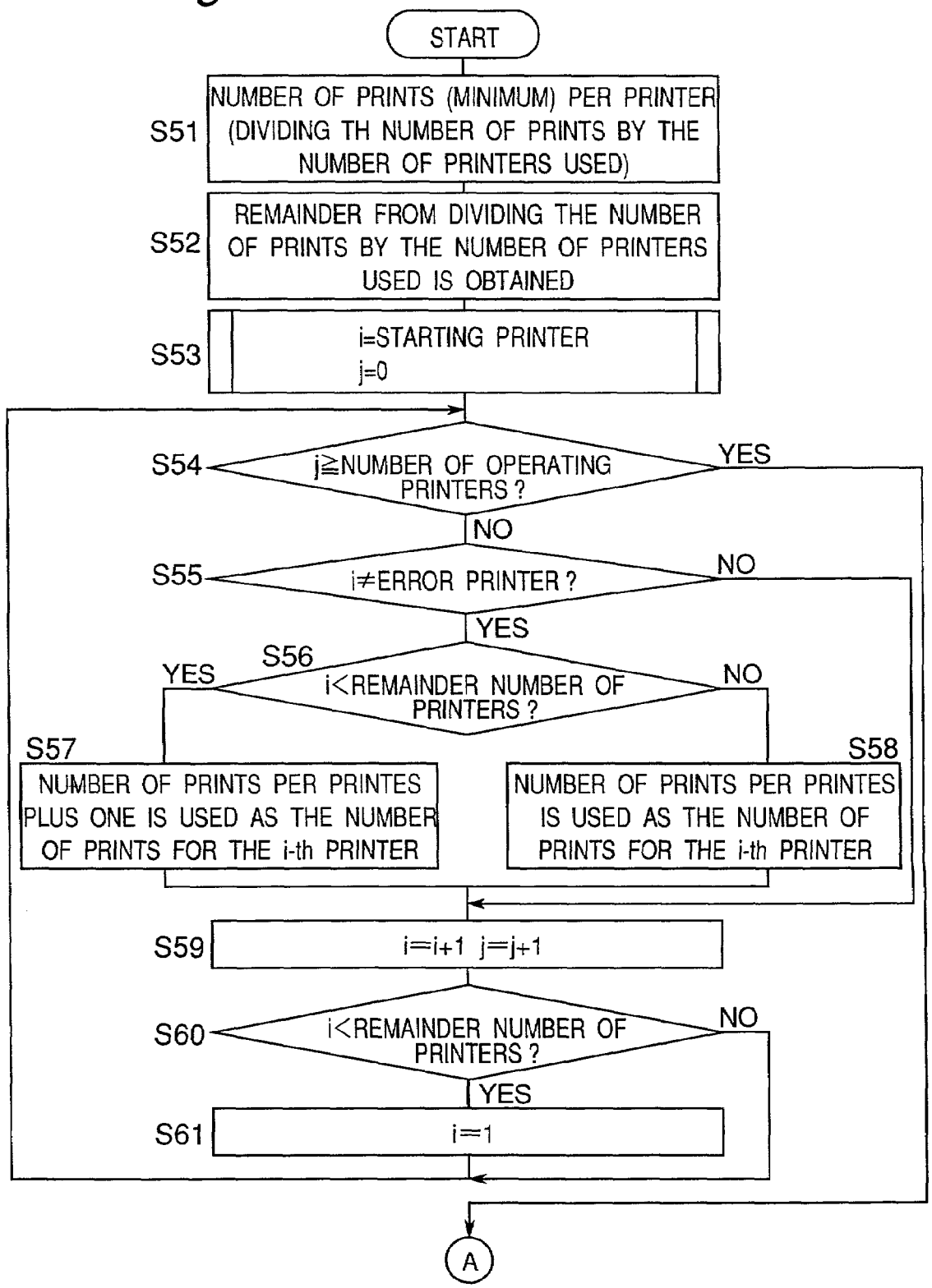
FIG. 5 is a flow chart of scheduling when printing on a digital printer according to a first embodiment of the present invention.
Figure 6:
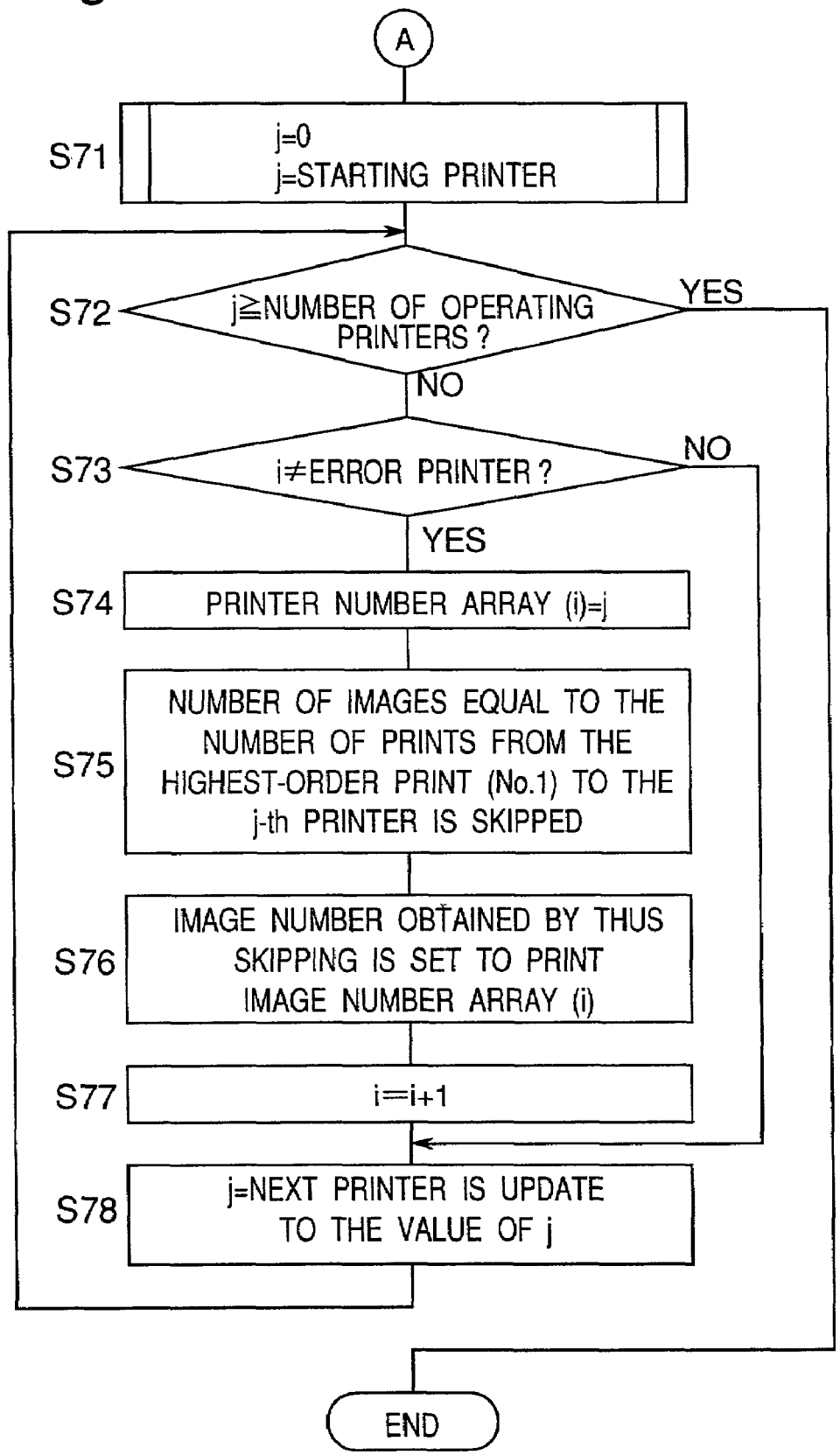
FIG. 6 is a continuation of th flow chart in FIG. 5.

Reference numeral 17 is a collecting device 17 for collecting in one place the prints P printed out on each printer 15. So that the collected prints are stacked in the order photographed (plural copies of the same picture are stacked together), main processor 12 has a scheduling function for adjusting the order in which the image data is sent to and output from the printers 15 according to a procedure as shown in the flow charts in FIG. 5 and FIG. 6.

In step S51, the number of prints (minimum) per printer is obtained by dividing the number of prints by the number of printers used. In step S52, the remainder from dividing the number of prints by the number of printers used is obtained. In step S53, the i-th printer is defined as the starting printer (the first printer to operate), and the printer count j is set to 0.

In step S54, it is determined whether j is greater than or equal to the number of operating printers; if the value of j is greater than or equal to the number of operating printers, control steps to step S71, and control otherwise steps to step S55 where it is determined if the i-th printer is an error printer (that is, if printing is not possible because ink is depleted or there is no paper). If it is not an error printer, control advances to step S59; if it is an error printer, control advances to step S56.

In step S56, it is determined whether the value of i is less than the remainder number of printers; if it is less than the remainder, the number of prints per printer plus one is used as the number of prints for the i-th printer in step S57; if it is not less than the remainder, the number of prints per printer is used as the number of prints for the i-th printer in step S58.

Next, in step S59, the values of i and j are both incremented, and in step S60 it is determined whether the value of i is less than the remainder. If it is not less than the remainder, the procedure loops back to step S54; if it is less than the remainder, the value of i is set to 1 in step S61, and the procedure loops back to S54.

In step S71 the value of j is set to 0, and the j-th printer is set to the starting printer. In step S72, it is determined whether the value of i is greater than or equal to the number of operating printers. If i is greater than or equal to the number of operating printers, this procedure ends; otherwise control advances to step S73 where it is determined whether the j-th printer is an error printer. If it is not an error printer, control advances to step S78, but if it is, control advances to step S74.

In step S74, the printer number array (i) is set to j. In step S75 the number of images equal to the number of prints from the highest-order printer (No. 1) to the j-th printer is skipped. In step S76, the image number obtained by thus skipping is set to print image number array (i).

In step S77 the value of i is incremented, in step S78 the next printer is updated to the value of j, and then the procedure loops back to step S72.

Figure 7:
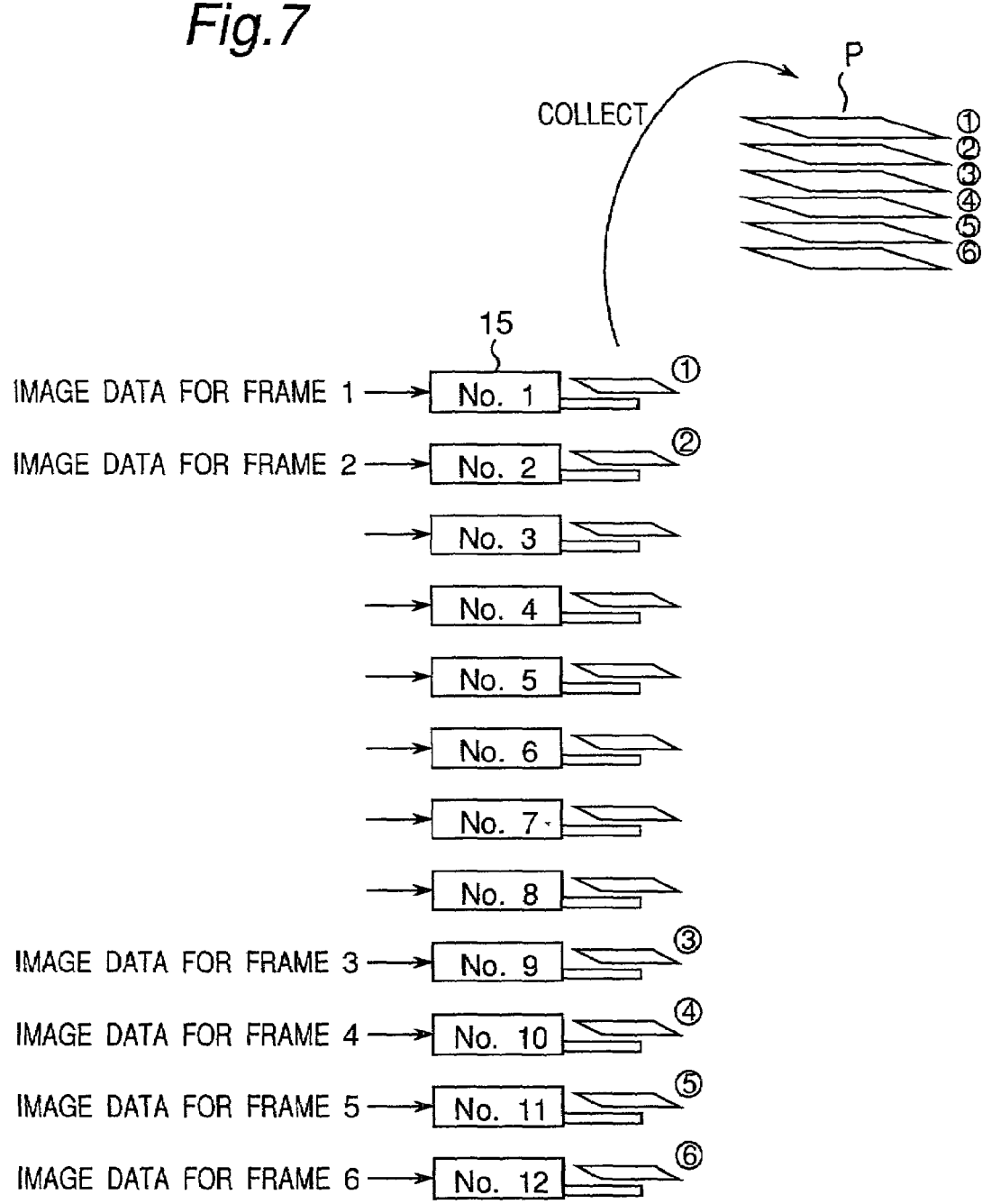
FIG. 7 shows the operation of each printer when printing a plurality of photographs.

FIG. 7 shows an exemplary process for when, for example, printers 15 number 1 to number 8 were used for a previous print job, and there is a request to print frames 1 to 6. In this case, printers number 9 to 12 and numbers 1 and 2 are used so that ink is evenly consumed in each of the printers 15.

In this case, image data for frame 3 is supplied to the number 9 printer 15 rather than image data for frame 1, image data for frames 4 to 8 is supplied to the number 10 to 12 printers 15, and image data for frames 1 and 2 is supplied to the number 1 and 2 printers 15.

A schedule for determining the sequence and timing for supplying specific image data to each printer 15 is described in detail below. It should be noted that for convenience the seven printers number 1 to 7 are used.

FIG. 8 shows a control sample in which twenty prints are printed from the No. 3 printer, and then ten prints are printed at the next print request. In this case, the No. 3 to No. 7 printers print frames 8, 11, 14, 17, and 20, respectively; then No. 1 to No. 7 printers 15 print frames 3, 5, 7, 10, 13, 16, and 19, respectively; then No. 1 to No. 7 printers 15 print frames 2, 4, 6, 9, 12, 15, and 18; and finally the No. 1 printer prints frame 1.

When printing is thus accomplished, prints are stacked in the tray of the No. 1 printer from top to bottom in the sequence:

frame 1 photograph frame 2 photograph frame 3 photograph;

in the tray of the No. 2 printer from top to bottom in the sequence:

frame 4 photograph frame 5 photograph;

until in the tray of the No. 7 printer photographs are stacked from top to bottom in the sequence:

frame 18 photograph frame 19 photograph frame 20 photograph.

Therefore, if the collecting device 17 collects the pictures in the tray of each printer from the bottom, the photographs can be collected in the sequence frame 1 photograph frame 2 photograph frame 3 photograph

:

frame 18 photograph frame 19 photograph frame 20 photograph.

That is, in the sequence in which the pictures were taken.

When ten prints are next printed, they are printed from the No. 2 printer.

It should be noted that if it is acceptable to not collect the photographs in the order taken, they can be printed in simple frame sequence so that, for example, frame 1 is printed to No. 3 printer, the first printer used, and frame 2 is printed to the next printer, No. 4. In this case, collecting device 17 is not particularly necessary, and the prints obtained from each printer can be simply collected in one place using a chute, for example.

FIG. 9 shows a control sample in which an error occurs while printing the second print on the No. 5 printer when printing twenty pictures. Rescheduling is accomplished at this time so that frames 12 and 13 to be printed on the No. 5 printer are printed on the No. 6 printer, and the No. 5 printer is removed in the next printing sequence.

FIG. 10 also shows a control sample in which a print error occurs while printing the second print on the No. 5 printer during scheduling, and frames 12 and 13 that can not be printed are printed out on the No. 2 and No. 3 printers.

FIG. 11(A) shows conventional control. Read JPEG compressed image data is JPEG expanded to bitmap data, the image data is sent to the printer after converting RGB color data to YMC color data suitable for the printer, and JPEG expansion of the next image data is accomplished when this data transfer is completed.

In this conventional method it is not possible to advance to the next process until image data has been JPEG expanded and the image data has been transferred to the printer. Furthermore, the data transfer itself is time consuming because the data is transferred after image data expansion, thus increasing the time needed to print a plurality of pictures.

Figure 11:
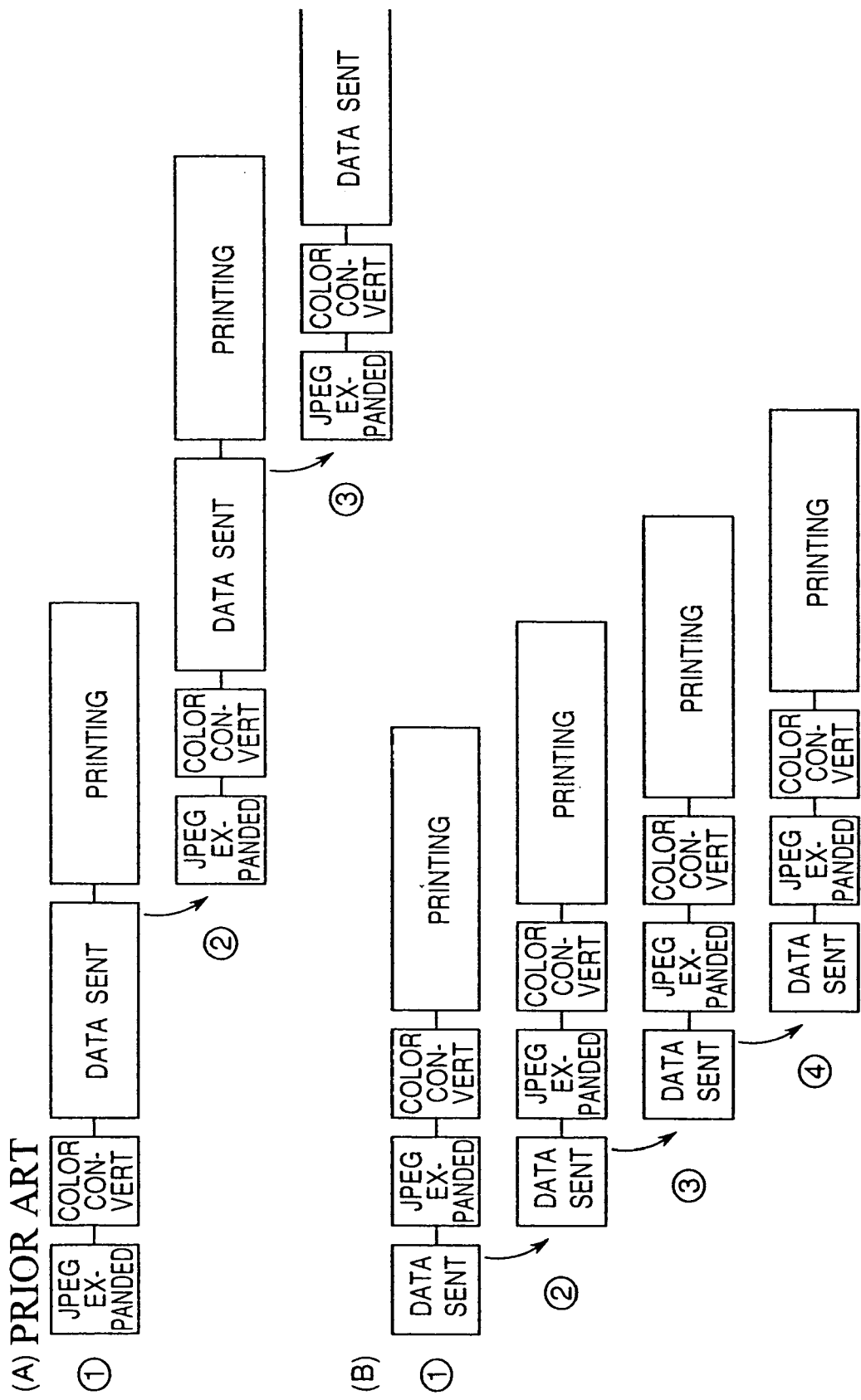
FIG. 11 is a timing chart showing an image data processing method according to the prior art and in the present invention.

In the present invention as shown in FIG. 11(B), on the other hand, it is possible to read the next image data as soon as the read image data is transferred to the printer because an image processing circuit 36 for JPEG expansion and color conversion is provided in each printer. In addition, the data transfer time is significantly shorter compared with the transfer time shown in FIG. 11 (A) because the transferred data is the JPEG compressed data (that is, compressed to approximately $\frac{1}{10}$ to $\frac{1}{20}$). As a result, the printing time for a plurality of prints can be significantly reduced because it is possible to substantially simultaneously operate each printer (the number of printers operated increases).

Figure 12:
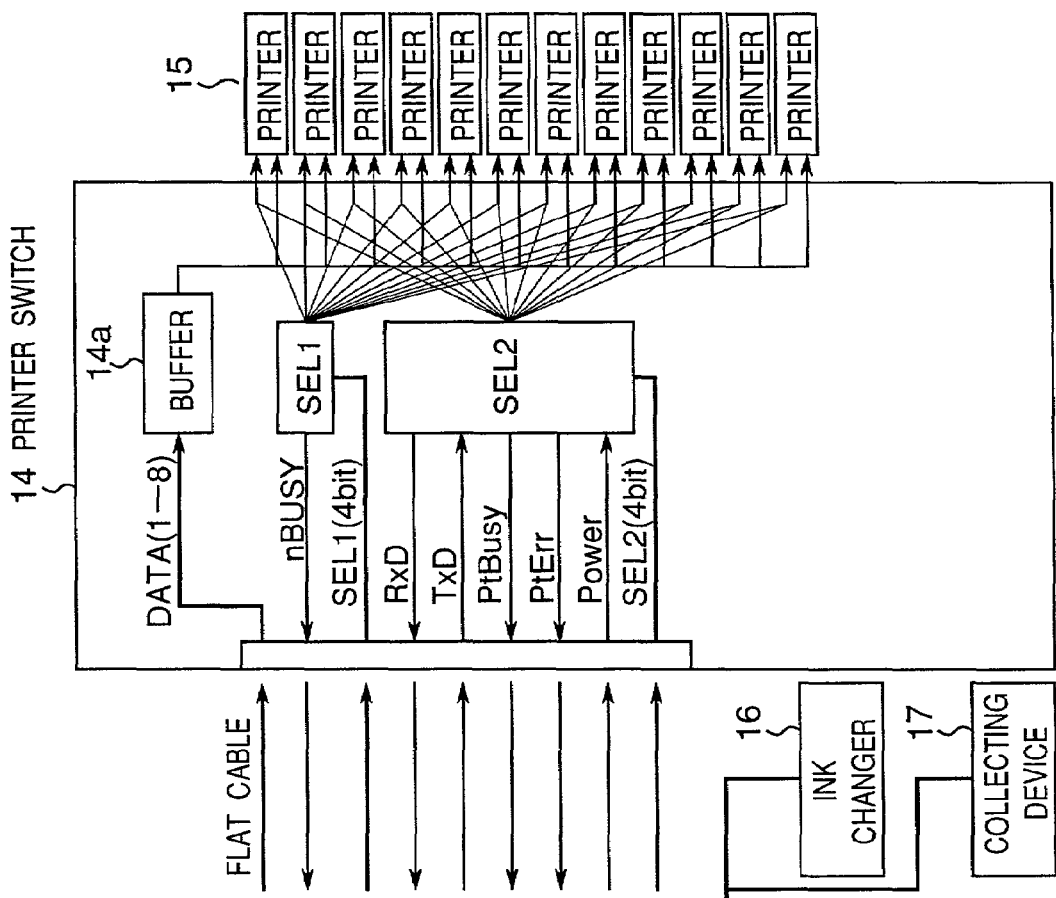
FIG. 12 is a detailed control block diagram of a controller and printer selector shown in FIG. 4.

FIG. 12 is a detailed block diagram of the controller 13 and printer switch 14. Image data supplied as a parallel Centronics signal is supplied by way of controller 13 to printer switch 14. At the same time, an RS-232C serial signal for communicating with the main processor 12 is captured by CPU 13a in the controller 13, and drive signals for controlling printers 15, ink changer 16, and collecting device 17 are generated. The ink changer 16 and collecting device 17 are controlled by the controller 13.

In printer switch 14, buffer 14a temporarily stores and supplies to each printer 15 image data supplied by way of controller 13. Selector SEL2 selects which printer 15 to use, and selector SELL returns busy signals from a selected printer 15.

Figure 13:
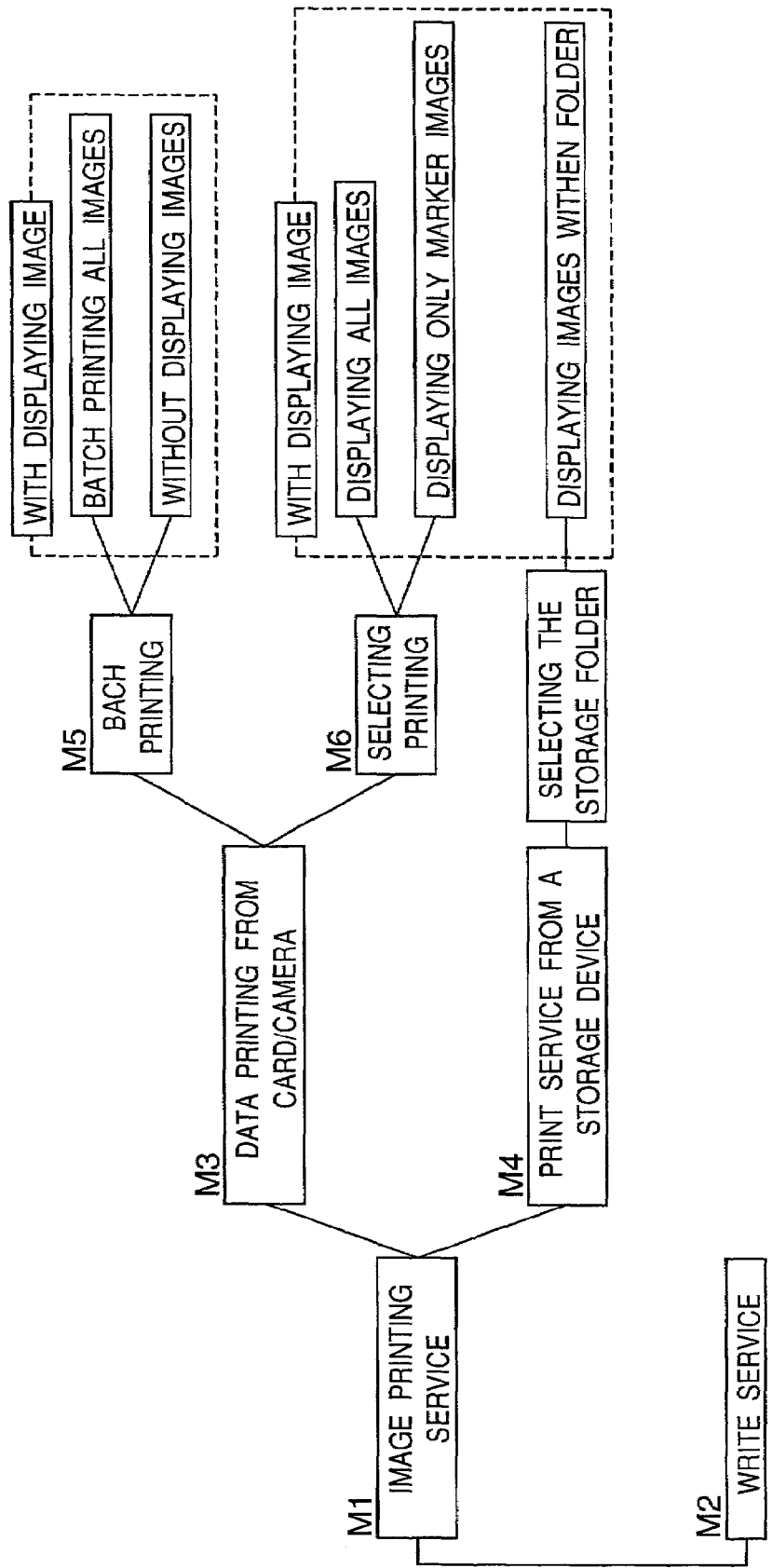
FIG. 13 shows the flow of operating modes in the present invention.

FIG. 13 is a flow chart of the operating modes in this embodiment. There are menus for an image printing service M1 and a write service M2; when the image printing service M1 is selected, a menu for a data printing service M3 for data read from an above-noted card or camera, and a print service M4 for data from a storage device, is displayed. If the data printing service M3 is selected, a menu for printing service M5 for batch printing all images, and a print service M6 for selecting and printing only needed images, is displayed. If the batch printing service M5 is selected, a selection for a batch printing service for all images, and a service for batch printing only marked images, is displayed.

Figure 14:
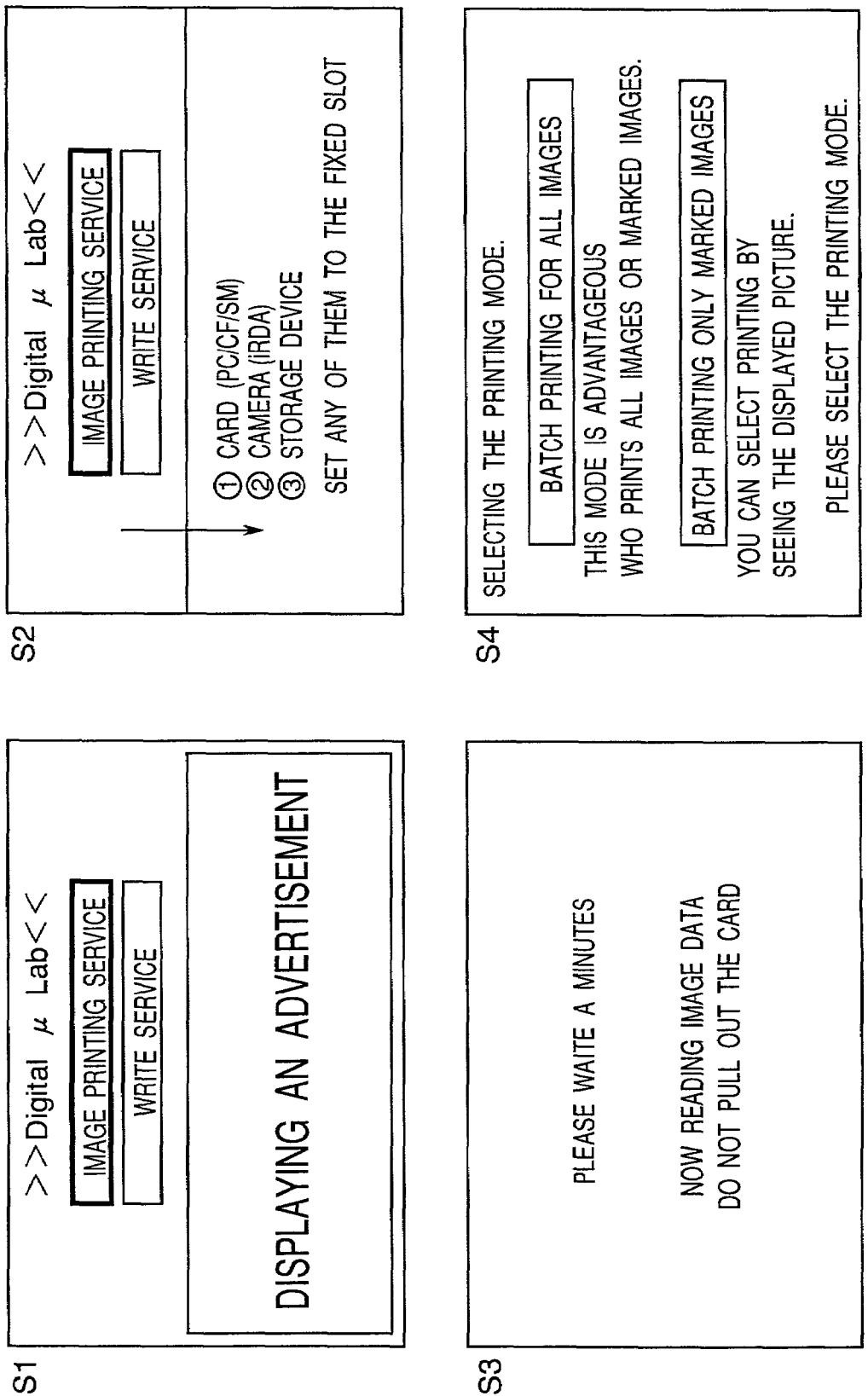
FIG. 14 shows the operating sequence presented on a display when selecting the image printing service, and whether to print or batch print from a card or camera, in FIG. 13.
Figure 15:
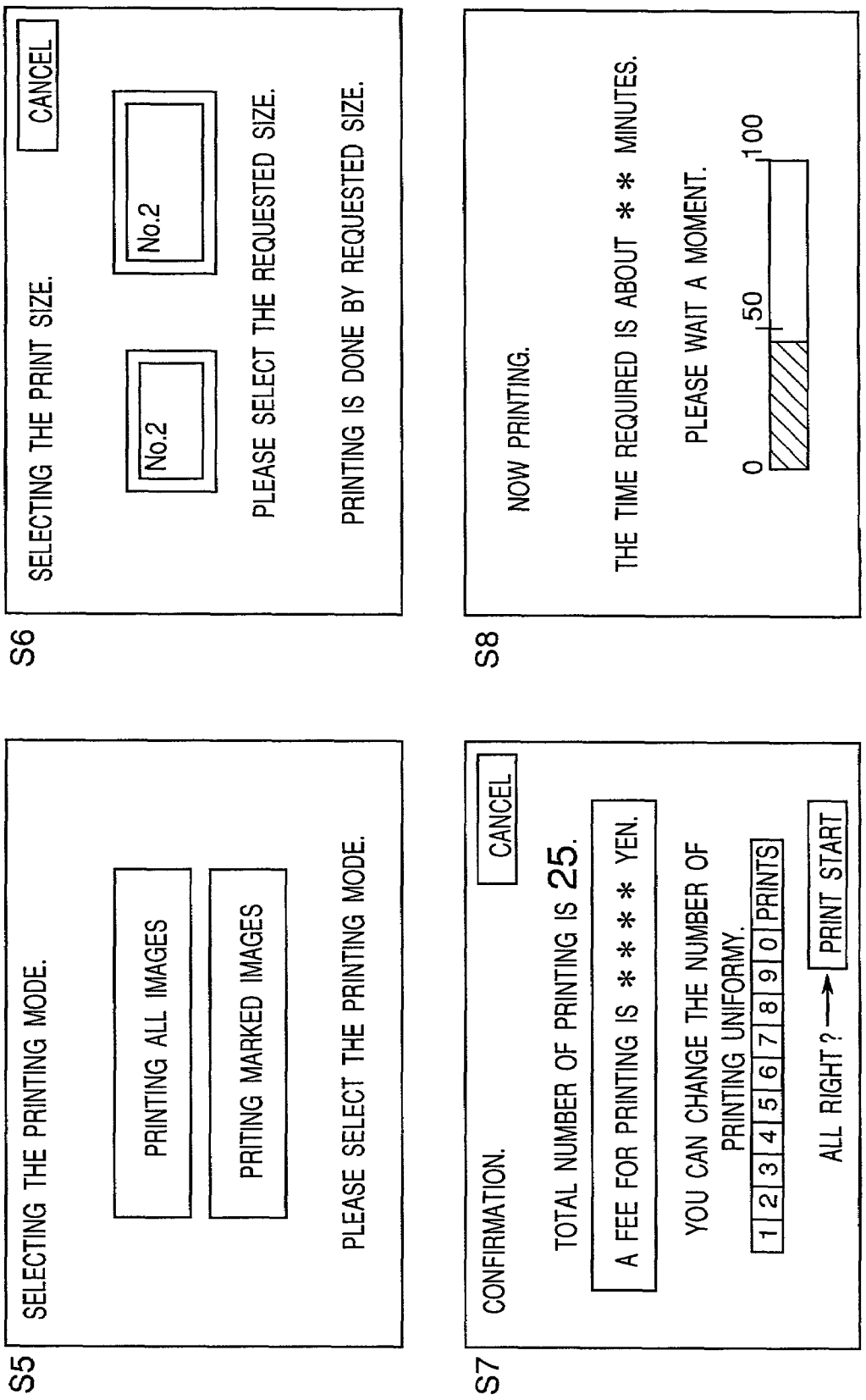
FIG. 15 is a continuation of the operating sequence shown in FIG. 14.

A sequence of screen operations for when modes M1, M3, and M5 are selected in sequence is shown in FIG. 14 and FIG. 15.

During standby, the image printing service M1 and write service M2 menu shown in S1 is presented. If the image printing service M1 is selected, a prompt for loading a memory card, camera, or other storage device such as a memory card is presented as shown in S2. When any of these is loaded, the image data is read, and a screen such as shown in S3 is presented.

Image files can be stored without a directory structure such as with a PC card, or image files can be stored with a directory structure, and the file structure differs according to the manufacturer of the digital still camera. The ease of use of this printer would be poor if each directory needed to be individually specified in order to read files. Therefore, in the present embodiment image files are first read from the root directory, then any subdirectory if located, and image files in the subdirectory are read. If there is a lower subdirectory under a particular subdirectory, image files in that further subdirectory are additionally retrieved. Compatibility with a variety of directory structures can be achieved and image files can be read by using this type of retrieval method. If files are read from an MO disc, files are read in the same way.

Next, as shown in S4, a menu for the batch printing mode M5 and selected image print service M6 is displayed. If the batch printing service M5 is selected here, menu S5 containing a batch print service for all images, and a service for batch printing only marked images, is displayed. Whichever mode is selected, the print paper size selection screen is displayed next as shown in S6. Then, as shown in S7, the number of prints and the cost when printing all frames one at a time (or the marked frames) are displayed. It is also possible to make plural prints as needed. When printing is started, how much more time is needed for printing is displayed and shown in a bar graph as shown in S8. When printing is completed, a screen as shown in S28 in FIG. 19 and described below is presented.

Figure 16:
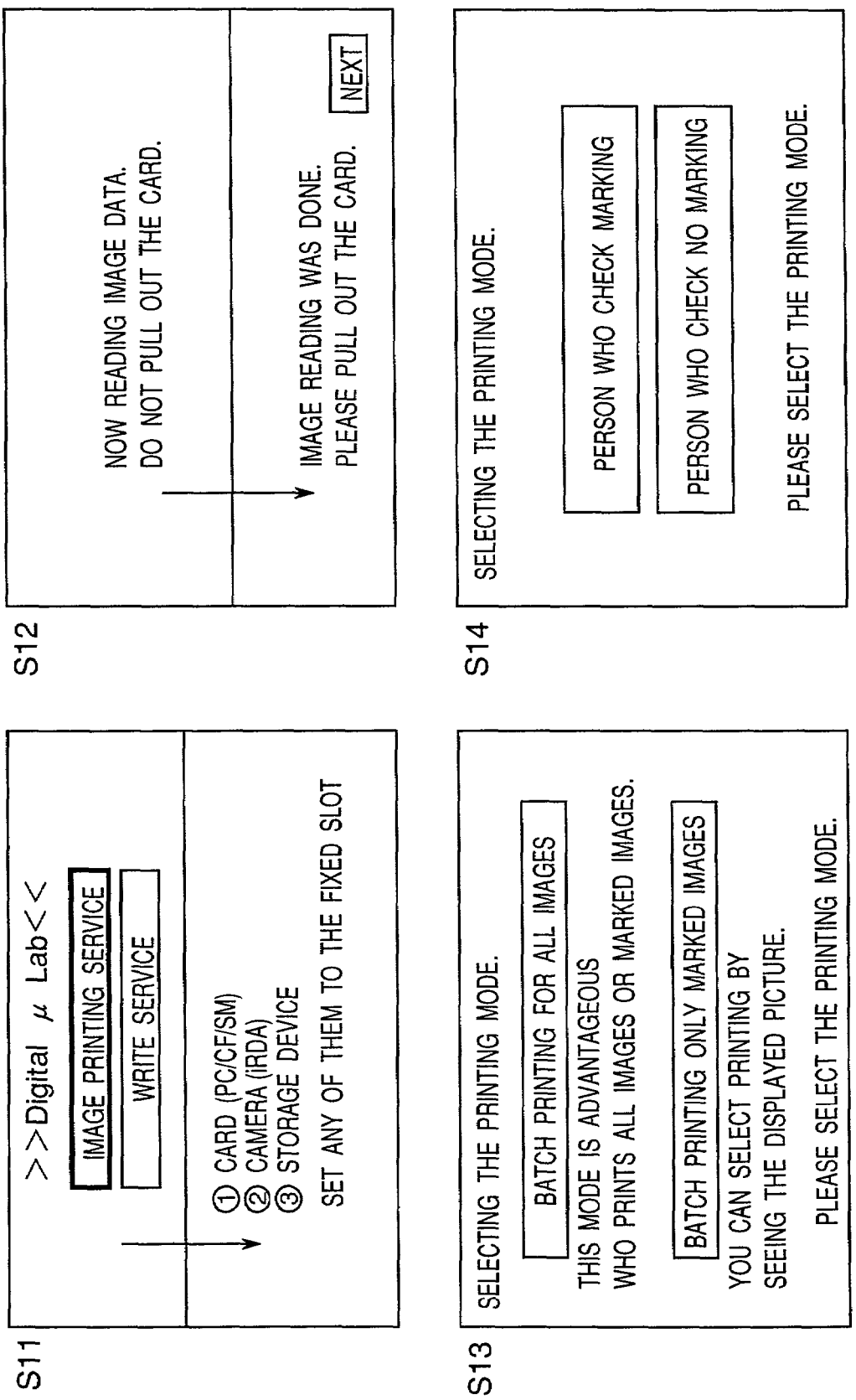
FIG. 16 shows the operating sequence presented on a display when selecting the image printing service, and whether to print or select print images from a card or camera, in FIG. 13.

A sequence of screen operations for when modes M1, M3, and M6 are selected in sequence is shown in FIG. 16 and FIG. 17.

When image printing service M1 is selected in S11, and print mode M3 for printing from a memory card, camera, or storage device (Superdisk) is selected, the image data is read in S12 and print mode M6 for print selection is selected in S13, input for selecting whether the images are marked or not is awaited as shown in S14. As shown next in S15, thumbnail images of all images are displayed with the marked images indicated by, for example, a border therearound, thus enabling the marked images to be changed in this screen. If no images are marked, the images to be printed can be selected in this screen. Next in S16, the number of prints to make for each image to be printed is specified. Next, as shown in S17, a print paper size selection screen is presented. Then, as shown in S18, the number of prints and the printing cost are displayed.

A sequence of screen operations for when modes M1 and M4 are selected in sequence is shown in FIG. 18 and FIG. 19.

When image printing service M1 is selected in S21 and then print service M4 for printing images from a storage device is selected, a folder in the storage device is displayed as shown in S22. If the folder to be printed is specified here, thumbnail sketches of all corresponding images are presented as shown in S23. The images desired for printing are selected in this screen. Next in S24, the number of prints to make for the images to be printed is specified. Next, as shown in S25, the print paper size selection screen is displayed. Then, as shown in S26, the number of prints and the printing cost are displayed. How much more time is needed for printing is then displayed and shown in a bar graph as shown in S27. When printing is completed, a display as shown in S28 is presented.

Figure 20:
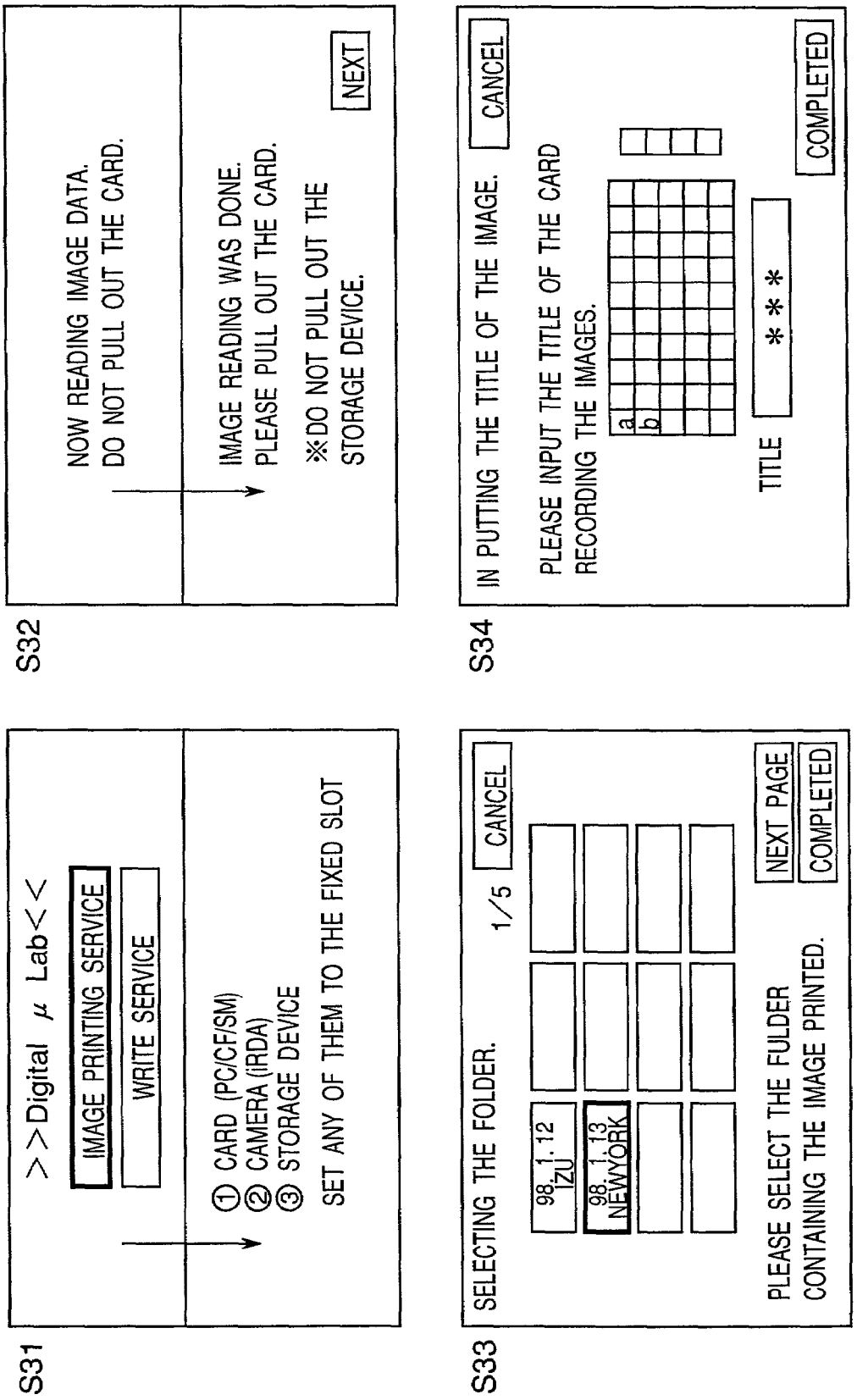
FIG. 20 shows the operating sequence presented on a display when selecting the write service in FIG. 13.

A sequence of screen operations for when mode M2 is selected is shown in FIG. 20 and FIG. 21.

When the write service M2 is selected in S31, a prompt instructing insertion of a medium containing the images to be stored and a memory device for storage is displayed. When the specified operation is accomplished, the image data to be stored is written as shown in S32. A table of folders in the memory device for storage is then presented as shown in S33, and the folder to be written to is then specified. When a title for the stored image is then entered in S34, a title confirmation screen is displayed as shown in S35 and the cost for recording is also displayed. If a write start command is then entered, storing the image data begins as shown in S36, and when recording is completed the displays in S37 and S38 are presented.

In the first embodiment described above, the printers are averagely used to avoid frequent ink replacement, and ink replacement is accomplished at once when ink is depleted for all printers. If ink replacement is accomplished automatically by means of ink changer 16, ink can be replaced in a relatively short time even if the ink is depleted in all printers while printing is in progress, and no inconvenience results. However, the cost increases by the amount for the ink changer. Furthermore, if an ink changer is not used, ink replacement must be done manually for all printers at one time. This is time-consuming and requires that any customer be kept waiting while the ink is replaced. It is therefore practically difficult to not use an ink changer.

A second embodiment of the present invention therefore has the function of a printer usage priority determining means 39a in place of the function of the above-noted print unit selector 39. This function selects the printer used so that the frequency of use of a single particular specific printer increases, and when the ink is depleted in that printer selects a separate printer to be used so that the frequency of use of that printer increases.

To increase the usage frequency, a printer (called the starting printer) is selected for priority use for printing operations. If the starting printer is, for example, the No. 1 printer, printing is always started from the No. 1 printer, and when the ink is depleted the No. 2 printer, for example, is set as the starting printer.

Figure 22A:
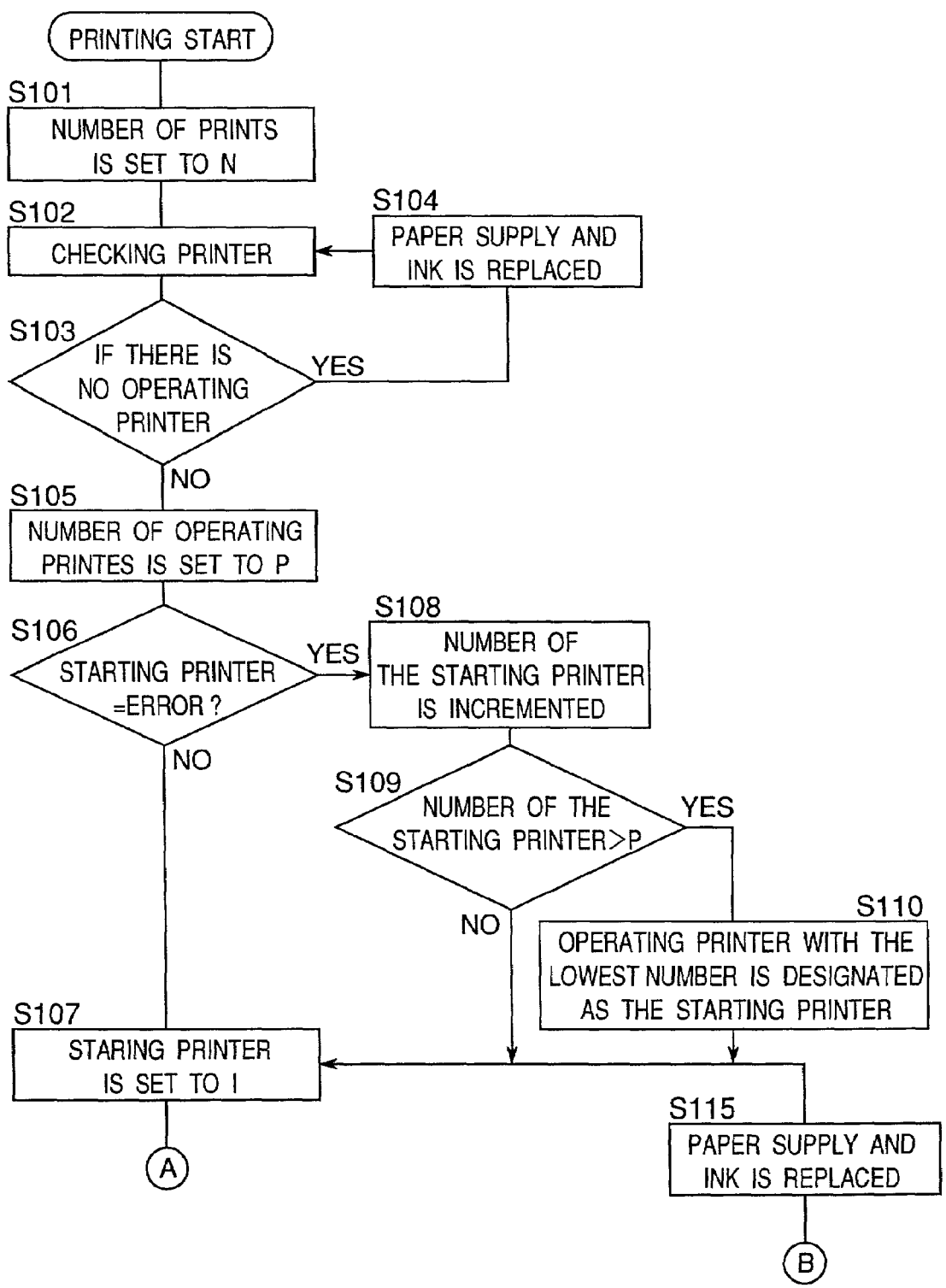
FIG. 22A and FIG. 22B are a flow chart showing the control of a digital printer according to a second embodiment of the present invention.
Figure 22B:
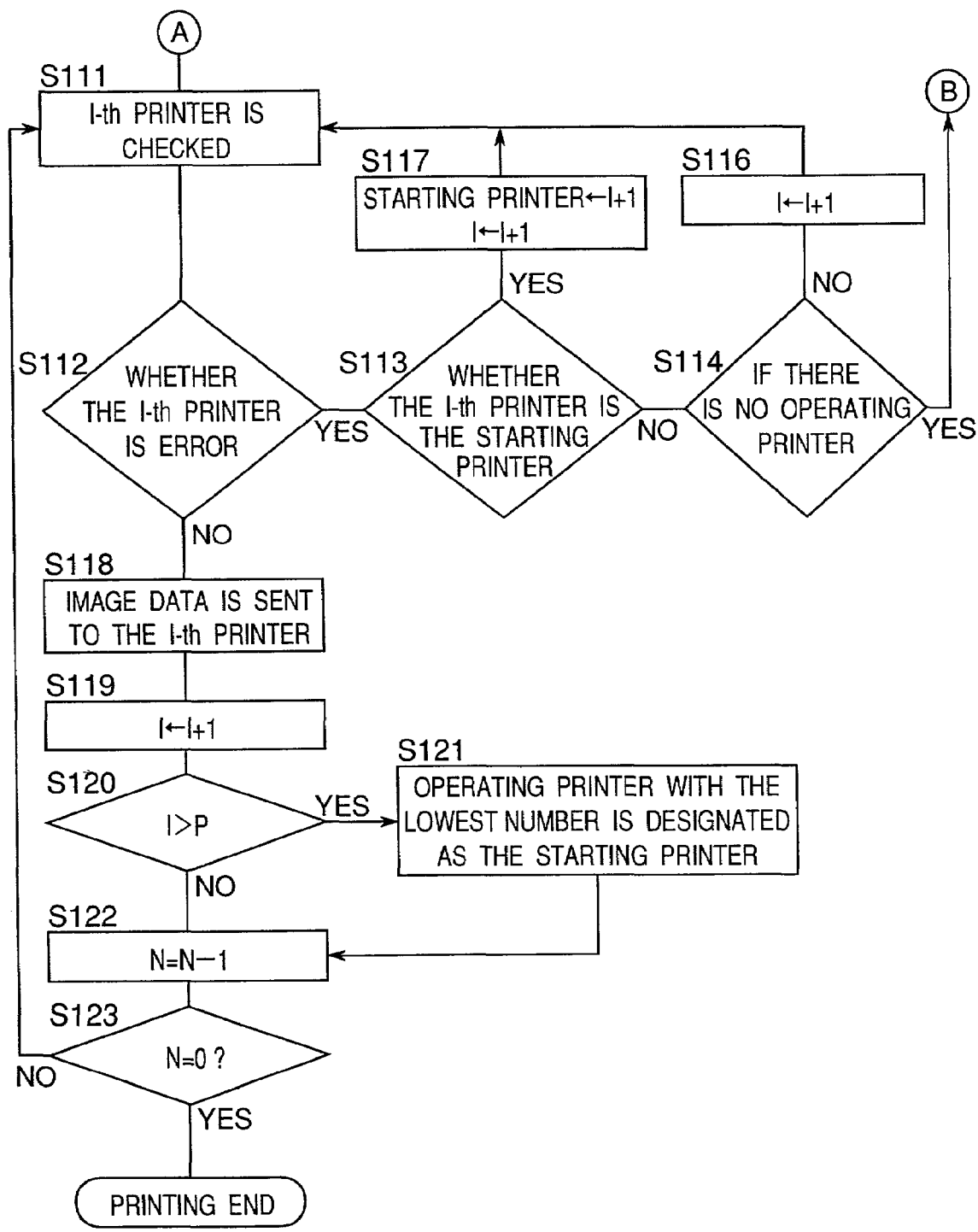

Operation of each printer based on this priority usage printer designation is shown in the flow chart in FIG. 22A and FIG. 22B. When the user enters the desired number of prints in step S101, this number of prints is set to N, and whether each printer 15 is operating is checked in step S102. In step S103, it is determined if there is no operating printer. If there is no operating printer, the paper supply is replenished and ink is replaced in step S104, and the procedure loops back to S102.

If there is a printer 15 that is operating, control advances to step S105 from step S103, and the number of operating printers is set to P. In step S106, it is determined whether an error has occurred in the starting printer; if not, control advances to step S107; if there has, the number of the starting printer is incremented in step S108, and the starting printer is redefined as the incremented number. In step S109, it is determined whether the number of the starting printer at this time exceeds P. If not, control advances to step S107, but if it has, the operating printer with the lowest number is designated as the starting printer in step S110, and control advances to step S107.

In step S107 the starting printer number is set to I. In step S111, the I-th printer is checked, and whether has occurred is determined in step S112. If there is an error, control advances to step S113, and it is determined whether the I-th printer is the starting printer. If the I-th printer is the starting printer, the value of I is incremented in step S117, the starting printer is set to the incremented I number, and the procedure loops back to S111.

On the other hand, if the I-th printer is determined not the starting printer in the evaluation of step S113, control advances to step S115, it is determined if there is no operating printer, and if there is not, paper is replenished and ink is replaced in step S116, and then control proceeds to step S107. On the other hand, if the evaluation of S115 determines that there is an operating printer, the value of I is incremented in step S117, and then the procedure loops back to step S111.

If in the evaluation of step S112 there is no error in the I-th printer, control advances to step S118 and image data is sent to the Iath printer. That the transferred image data is expanded from JPEG image data to bitmap data on the printer 15 side, and processing the next image data proceeds without waiting for this image expansion process, are the same as in the control in the previous embodiment (FIG. 11 (B)).

Next, the value of I is incremented in step S119, and in step S120 it is determined whether I exceeds the operating printer count P; if it does, control advances to step S121, the operating printer with the lowest number is set to I, and control advances to step S122. However, if I does not exceed P, control advances to step S122.

In step S122 the value of the number of remaining prints is decremented, then in step S123 it is determined whether N has reached 0; if it is not 0, the procedure loops back to step S111, but if it is 0, that is, printing the desired number of prints has been completed, this control procedure ends.

An actual printing operation based on this type of control is described next with reference to FIG. 23. It should be noted here that the No. 1 printer 15 of the twelve printers 15 is defined as the starting printer, and for ease of explanation the printer that has run out of ink is an error printer.

When three prints are requested the first time, the No. 1, No. 2, and No. 3 printers 15 are selected as the printers to use so that the No. 1 printer is included by priority, and printing is then accomplished using these printers. It should be noted here that the "ON" in "ON/19" shown in the figure indicates the printer is operating, "19" indicates the number of prints remaining after printing, and each printer can make twenty prints after replacing the ink.

If two prints are requested the second time, printing is again accomplished on the No. 1 and No. 2 printers so that the starting printer, No. 1, is included by priority, and when five prints are requested the third time, the No. 1 to No. 5 printers are used for printing.

When two prints are requested the 21st time, the No. 1 and No. 2 printers are used for printing in the same way. However, because the number of remaining prints reaches 0 after using printer No. 1, the starting printer is reset to the No. 2 printer at the next printing operation (the 22nd time), the No. 1 printer is set to an error printer status, and the No. 1 printer is removed from the usable printer list. That the number of remaining prints in the No. 1 printer is again 20 at the 23rd printing operation is because the error printer status was cancelled as a result of the ink being replaced.

Because the number of remaining prints also goes to 0 in the No. 2 printer, which is now designated as the starting printer, during the 22nd printing operation, the No. 3 printer is designated as the starting printer in the 23rd printing operation. The sequence for designating the starting printer thus changes in the sequence No. 1→No. 2→No. 3→ . . . No. 11"No. 20 so that if the ink is replaced in the No. 1 printer, it will be designated next as the starting printer.

It should be noted that to simplify the description for printing according to the flow chart shown in FIG. 22A and FIG. 22B image data for printing N images is transferred in simple sequence to the printers, but by controlling the destination to which the image data is sent and the output sequence as noted in the first embodiment above, the printed photographs can be collected in the sequence in which they were photographed.

By accomplishing image processing such as expanding compressed images in the individual printers as described above, it is possible to greatly reduce the time required to print a plurality of images when a plurality of images is printed in parallel on a plurality of printers because the data transfer time is short as a result of the size of the image data sent to a single printer being small, and the next image can be immediately sent to a separate printer as soon as data transfer is completed.

Furthermore, by averagely using a plurality of printers in a first embodiment (claim 2) of the present invention, ink and paper can be replenished en masse to all printers when the ink is depleted or paper runs out, and the frequency of maintenance can be reduced.

Moreover, by using a predetermined printer with priority so that that printer runs out of ink or paper first in a second embodiment (claim 4) of the present invention and replenishing ink or paper to that printer as they are depleted, a configuration not having an ink changer can be easily achieved because it is unlikely that all printers will run out of ink at the same time.

The invention claimed is:

1. A printer system comprising:
    data reading means for reading compressed image data from a storage medium;
    setting means for setting printing parameters;
    a plurality of printers;
    a plurality of image processing circuits located within said plurality of printers, wherein said image processing circuits are configured to expand said compressed image data for use by said plurality of printers, respectively;
    printer selection means for selecting which of the plurality of printers to use, wherein the printer selection means comprise:
    a scheduling function configured:
        to calculate a number of prints per printer by dividing a number of prints by a number of the plurality of printers;
        to send the number of prints per printer plus one to an I-th printer with a number less than a remainder number of printers; and
    to send the number of prints per printer to an I-th printer with a number not less than a remainder number of printers, wherein at a beginning of a print cycle the I-th printer is initialized as a next printer after a last I-th printer of a previous print cycle; and
    a controller for a) sending a specific control signal to the printer selection means and for b) sending said compressed image data to a selected one of said printers based on information provided by the setting means.

2. A printer system as described in claim 1, further comprising a printer usage determining means for determining which of the printers to use so that average use of each printer is approximately the same.

3. A printer system as described in claim 2, further comprising an ink changer for batch replacing ink used by each of said printers with spare ink.

4. A printer system as described in claim 1, further comprising a printer usage priority determining means for determining which of said printers is to be used so that a predetermined one of said printers from the plurality of printers is given priority.

5. A printer system as described in claim 4, wherein the printer usage priority determining means sets a starting printer in a print operation such that when the starting printer is a first printer of said printers, printing is accomplished from said first printer, and if that printer becomes unusable, a second printer of said printers is set as the starting printer.

6. A printer system as described in claim 1, further comprising an interface whereby an operating procedure for printing can be accomplished according to a direction presented on a display device.

7. A printer system as described in claim 1, wherein said printers are dye sublimation type printers.

8. A printer system as described in claim 1, further comprising:
- a collecting mechanism for collecting photographs printed on each of said printers, and
- destination/sequence adjusting means for scheduling a transfer destination and an output sequence for image data supplied to each of said printers when printing is accomplished in parallel so that photographs can be collected in the sequence photographed.

9. A printer system as described in claim 1, further comprising a function for reading image data stored to a digital camera and writing to a desired storage medium.

* * * * *